(12) United States Patent
Noyes et al.

(10) Patent No.: US 9,836,555 B2
(45) Date of Patent: Dec. 5, 2017

(54) METHODS AND DEVICES FOR SAVING AND/OR RESTORING A STATE OF A PATTERN-RECOGNITION PROCESSOR

(75) Inventors: Harold B Noyes, Boise, ID (US); David R. Brown, Lucas, TX (US)

(73) Assignee: Micron Technology, Inc., Boise, ID (US)

( * ) Notice: Subject to any disclaimer, the term of this patent is extended or adjusted under 35 U.S.C. 154(b) by 1094 days.

(21) Appl. No.: 12/492,824

(22) Filed: Jun. 26, 2009

(65) Prior Publication Data

US 2010/0332809 A1    Dec. 30, 2010

(51) Int. Cl.
| | | |
|---|---|---|
| G06F 15/00 | (2006.01) | |
| G06F 7/38 | (2006.01) | |
| G06F 9/00 | (2006.01) | |
| G06F 9/44 | (2006.01) | |
| G06F 17/30 | (2006.01) | |
| G06F 11/30 | (2006.01) | |

(52) U.S. Cl.
CPC .... G06F 17/30985 (2013.01); G06F 11/3072 (2013.01)

(58) Field of Classification Search
None
See application file for complete search history.

(56) References Cited

U.S. PATENT DOCUMENTS

| | | | |
|---|---|---|---|
| 5,300,830 A | 4/1994 | Hawes | |
| 5,331,227 A | 7/1994 | Hawes | |
| 5,844,422 A * | 12/1998 | Trimberger | H03K 19/17772 326/38 |
| 6,240,003 B1 | 5/2001 | McElroy | |
| 6,880,087 B1 | 4/2005 | Carter | |
| 6,906,938 B2 | 6/2005 | Kaginele | |
| 6,944,710 B2 | 9/2005 | Regev et al. | |
| 7,089,352 B2 | 8/2006 | Regev et al. | |
| 7,146,643 B2 | 12/2006 | Dapp et al. | |
| 7,392,229 B2 | 6/2008 | Harris et al. | |
| 7,487,131 B2 | 2/2009 | Harris et al. | |
| 7,487,542 B2 | 2/2009 | Boulanger | |
| 7,774,286 B1 | 8/2010 | Harris | |

(Continued)

FOREIGN PATENT DOCUMENTS

WO    03023548    3/2003

OTHER PUBLICATIONS

Dake Liu et al.; Power Consumption Estimation in CMOS VLSI Chips; IEEE Journal of Solid-State Circuits USA, vol. 29, No. 6, Jun. 1994 (Jun. 1994), pp. 663-670, XP002601496.

(Continued)

Primary Examiner — George Giroux
(74) Attorney, Agent, or Firm — Fletcher Yoder, P.C.

(57) ABSTRACT

Systems and methods are disclosed for saving and restoring the search state of a pattern-recognition processor. Embodiments include a pattern-recognition processor having a state variable array and a state variable storage array stored in on-chip memory (on-silicon memory with the processor). State variable storage control logic of the pattern-recognition processor may control the saving of state variables from the state variable array to the state variable storage array. The state variable storage control logic may also control restoring of the state variables from the state variable storage array to restore a search state.

29 Claims, 13 Drawing Sheets

(56) References Cited

U.S. PATENT DOCUMENTS

| | | | |
|---|---|---|---|
| 8,065,249 | B1 | 11/2011 | Harris |
| 2003/0110208 | A1* | 6/2003 | Wyschogrod et al. ........ 709/202 |
| 2004/0215593 | A1* | 10/2004 | Sharangpani ..... G06F 17/30982 |
| 2007/0075878 | A1 | 4/2007 | Furodet et al. |
| 2007/0127482 | A1* | 6/2007 | Harris ....................... G06F 7/02 370/392 |
| 2007/0282833 | A1 | 12/2007 | McMillen et al. |
| 2008/0071781 | A1* | 3/2008 | Ninan et al. ...................... 707/6 |
| 2009/0049230 | A1* | 2/2009 | Pandya .......................... 711/101 |
| 2009/0083263 | A1* | 3/2009 | Felch et al. ........................ 707/5 |
| 2011/0307433 | A1 | 12/2011 | Dlugosch |
| 2011/0307503 | A1 | 12/2011 | Dlugosch |
| 2012/0192163 | A1 | 7/2012 | Glendenning |
| 2012/0192164 | A1 | 7/2012 | Xu |
| 2012/0192165 | A1 | 7/2012 | Xu |
| 2012/0192166 | A1 | 7/2012 | Xu |

OTHER PUBLICATIONS

Beesley, K. R.; Arabic Morphology Using Only Finite-State Operations; Xerox Research Centre Europe; pp. 50-57.

Bird, S. et al.; One-Level Phonology: Autosegmental Representations and Rules as Finite Automata; Association for Computational Linguistics; University of Edinburgh; vol. 20; No. 1; pp. 55-90; 1994.

Bispo, J. et al.; Regular Expression Matching for Reconfigurable Packet Inspection; IEEE.

Bispo, J. et al.; Synthesis of Regular Expressions Targeting FPGAs: Current Status and Open Issues; IST/INESC-ID, Libson, Portugal; pp. 1-12.

Brodie, B. et al.; A scalable Architecture for High-Throughput Regular-Expression Pattern Matching; Exegy Inc.; pp. 1-12.

Clark, C.; Design of Efficient FPGA Circuits for Matching Complex Patterns in Network Intrusion Detection Systems (Master of Science Thesis); Georgia Institute of Technology; pp. 1-56; Dec. 2003.

Clark, C.; A Unified Model of Pattern-Matching Circuits for Field-Programmable Gate Arrays [Doctoral Dissertation]; Georgia Institute of Technology; pp. 1-177; 2006.

Clark, C. et al.; Scalable Pattern Matching for High Speed Networks; Proceedings of the 12$^{th}$ Annual IEEE symposium on Field-Programmable Custom Computing Machines (FCCM'04);Georgia Institute of Technology; pp. 1-9; 2004.

Clark, C. et al.; A Unified Model of Pattern-Matching Circuit Architectures; Tech Report GIT-CERCS-05-20;Georgia Institute of Technology; pp. 1-17.

Fide, S.; String Processing in Hardware; Scalable Parallel and Distributed Systems Lab; Proceedings of the 12$^{th}$ Annual IEEE symposium on Field-Programmable Custom Computing Machines (FCCM'04);School of Electrical and Computer Engineering; Georgia Institute of Technology; pp. 1-9; 2004.

Fisk, M. et al.; Applying Fast String Matching to Intrusion Detection; Los Alamos National Laboratory; University of California San Diego; pp. 1-21.

Korenek, J.; Traffic Scanner-Hardware Accelerated Intrusion Detection System; http://www.liberouter.org/ ;2006.

Kumar, S. et al.; Curing Regular Expressions matching Algorithms from Insomnia, Amnesia, and Acaluia; Department of Computer Science and Engineering; Washington University in St. Louis; pp. 117; Apr. 27, 2007.

Lipovski, G.; Dynamic Systolic Associative Memory Chip; IEEE; Department of Electrical and Computer Engineering; University of Texas at Austin; pp. 481-492; 1990.

Lin, C. et al.; Optimization of Pattern Matching Circuits for Regular Expression on FPGA; IEEE Transactions on Very Large Scale Integrations Systems; vol. 15, No. 12, pp. 1-6; Dec. 2007.

Schultz, K. et al.; Fully Parallel Integrated CAM/RAM Using Preclassification to Enable Large Capacities; IEEE Journal on Solid-State Circuits; vol. 31; No. 5; pp. 689-699; May 1996.

Shafai, F. et al.; Fully Parallel 30-MHz, 2.5-Mb CAM; IEEE Journal of Solid-State Circuits, vol. 33; No. 11; pp. 1690-1696; Nov. 1998.

Sidhu, R. et al.; Fast Regular Expression Pattern Matching using FPGAs; Department of EE-Systems; University of Southern California; pp. 1-12.

Wada, T.; Multiobject Behavior Recognition Event Driven Selective Attention Method; IEEE; pp. 1-16; 2000.

Yu, F.; High Speed Deep Packet Inspection with Hardware Support; Electrical Engineering and Computer Sciences; University of California at Berkeley; pp. 1-217; Nov. 22, 2006.

Freescale and Kaspersky® Accelerated Antivirus Solution Platform for Oem Vendors; Freescale Semiconductors Document; pp. 1-16; 2007.

Hurson A. R.; VLSI Design for the Parallel Finite State Automation and Its Performance Evaluation as a Hardware Scanner; International Journal of Computer and Information Sciences, vol. 13, No. 6. 1984.

Noyes, et al., U.S. Appl. No. 12/253,966, filed Oct. 18, 2008, "System and Method of Indirect Register Access".

Noyes, et al., U.S. Appl. No. 12/253,967, filed Oct. 18, 2008, "Indirect Register Access Method and System".

Noyes, U.S. Appl. No. 12/265,421, filed Nov. 5, 2008, "Methods and Systems to Accomplish Variable Width Data Input".

Noyes, et al., U.S. Appl. No. 12/265,436, filed Nov. 5, 2008, "Bus Translator".

Noyes, U.S. Appl. No. 12/265,465, filed Nov. 5, 2008, "Pattern-Recognition Processor with Results Buffer".

Noyes, et al., U.S. Appl. No. 12/268,270, filed Nov. 10, 2008, "Methods and Systems for Directly Connecting Devices to Microcontrollers".

Noyes, U.S. Appl. No. 12/325,875, filed Dec. 1, 2008, "Systems and Methods for Managing Endian Mode of a Device".

Noyes, U.S. Appl. No. 12/325,982, filed Dec. 1, 2008, "Systems and Methods to Enable Identification of Different Data Sets".

Noyes, U.S. Appl. No. 12/325,986, filed Dec. 1, 2008, "Devices, Systems, and Methods to Synchronize Simultaneous DMA Parallel Processing of a Single Data Stream by Multiple Devices".

Noyes, U.S. Appl. No. 12/325,990, filed Dec. 1, 2008, "Devices, Systems, and Methods to Synchronize Parallel Processing of a Single Data Stream".

Noyes, U.S. Appl. No. 12/347,403, filed Dec. 31, 2008, "Systems, Methods, and Devices for Configuring a Device".

Pawlowski, U.S. Appl. No. 12/350,132, filed Jan. 7, 2009, "Pattern-Recognition Processor with Matching-Data Reporting Module".

Pawlowski, U.S. Appl. No. 12/350,136, filed Jan. 7, 2009, "Buses for Pattern-Recognition Processors".

Pawlowski, U.S. Appl. No. 12/350,142, filed Jan. 7, 2009, "Methods and Systems for Power Consumption Management of a Pattern-Recognition Processor".

Noyes, U.S. Appl. No. 12/352,311, filed Jan. 12, 2009, "Devices, Systems, and Methods for Communicating Pattern Matching Results of a Parallel Pattern Search Engine".

Harris, U.S. Appl. No. 60/652,738, filed Feb. 12, 2005, "Means and Mechanism for Finding Meaningful Information in Databases or Data Sets by Topical Content Patterns at Speeds Exceeding Conventional Computers".

Taiwan Office Action dated Nov. 19, 2013.

* cited by examiner

METHODS AND DEVICES FOR SAVING AND/OR RESTORING A STATE OF A PATTERN-RECOGNITION PROCESSOR

BACKGROUND OF THE INVENTION

1. Field of the Invention

Embodiments of the invention relate generally to pattern-recognition processors and, more specifically, in certain embodiments, to management of data and results in pattern-recognition processors.

2. Description of the Related Art

In the field of computing, pattern-recognition tasks are increasingly challenging. Ever larger volumes of data are transmitted between computers, and the number of patterns that users wish to identify is increasing. For example, spam or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern-recognition may slow the receipt of data.

Further, such pattern-recognition processing may include the processing of multiple data streams and performance of other tasks in different orders. Any device performing the pattern-recognition processing may track each data stream and may switch processing from a data stream to another subroutine or function. In some processors for example, switching between data streams and tasks may be accomplished by saving the current state information of the processor into processor storage (e.g., the "stack"). The processor may then execute a subroutine or alternate function, and then restore the state from before the subroutine or alternate function was executed. However, saving and restoring the state information often takes a significant amount of time. Further, larger saving times may be undesirable for devices and/or processors having a large amount of state information.

DETAILED DESCRIPTION OF SPECIFIC EMBODIMENTS

Figure 1:
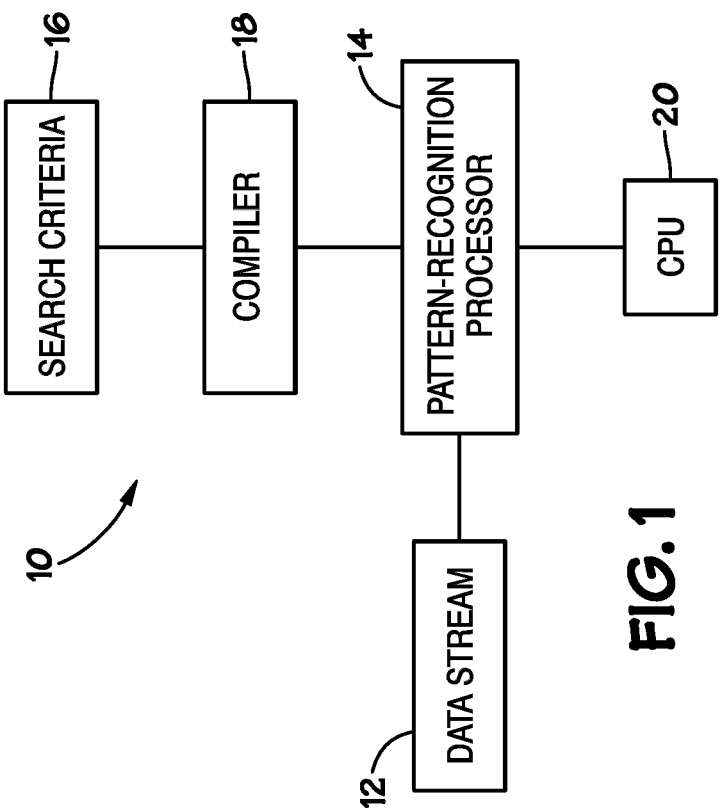
FIG. 1 depicts an example of system that searches a data stream.

FIG. 1 depicts an example of a system 10 that searches a data stream 12. The system 10 may include a pattern-recognition processor 14 that searches the data stream 12 according to search criteria 16.

Each search criterion may specify one or more target expressions, i.e., patterns. The phrase "target expression" refers to a sequence of data for which the pattern-recognition processor 14 is searching. Examples of target expressions include a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase.

A search criterion may specify more than one target expression. For example, a search criterion may specify all five-letter words beginning with the sequence of letters "cl", any word beginning with the sequence of letters "cl", a paragraph that includes the word "cloud" more than three times, etc. The number of possible sets of target expressions is arbitrarily large, e.g., there may be as many target expressions as there are permutations of data that the data stream could present. The search criteria may be expressed in a variety of formats, including as regular expressions, a programming language that concisely specifies sets of target expressions without necessarily listing each target expression.

Each search criterion may be constructed from one or more search terms. Thus, each target expression of a search criterion may include one or more search terms and some target expressions may use common search terms. As used herein, the phrase "search term" refers to a sequence of data that is searched for, during a single search cycle. The sequence of data may include multiple bits of data in a binary format or other formats, e.g., base ten, ASCII, etc. The sequence may encode the data with a single digit or multiple digits, e.g., several binary digits. For example, the pattern-recognition processor 14 may search a text data stream 12 one character at a time, and the search terms may specify a set of single characters, e.g., the letter "a", either the letters "a" or "e", or a wildcard search term that specifies a set of all single characters.

Search terms may be smaller or larger than the number of bits that specify a character (or other grapheme—i.e., fundamental unit—of the information expressed by the data stream, e.g., a musical note, a genetic base pair, a base-10 digit, or a sub-pixel). For instance, a search term may be 8 bits and a single character may be 16 bits, in which case two consecutive search terms may specify a single character.

The search criteria 16 may be formatted for the pattern-recognition processor 14 by a compiler 18. Formatting may include deconstructing search terms from the search criteria. For example, if the graphemes expressed by the data stream 12 are larger than the search terms, the compiler may deconstruct the search criterion into multiple search terms to search for a single grapheme. Similarly, if the graphemes expressed by the data stream 12 are smaller than the search terms, the compiler 18 may provide a single search term, with unused bits, for each separate grapheme. The compiler 18 may also format the search criteria 16 to support various regular expressions operators that are not natively supported by the pattern-recognition processor 14.

The pattern-recognition processor 14 may search the data stream 12 by evaluating each new term from the data stream 12. The word "term" here refers to the amount of data that could match a search term. During a search cycle, the pattern-recognition processor 14 may determine whether the currently presented term matches the current search term in the search criterion. If the term matches the search term, the evaluation is "advanced", i.e., the next term is compared to the next search term in the search criterion. If the term does not match, the next term is compared to the first term in the search criterion, thereby resetting the search.

Each search criterion may be compiled into a different finite state machine (FSM) in the pattern-recognition processor 14. The finite state machines may run in parallel, searching the data stream 12 according to the search criteria 16. The finite state machines may step through each successive search term in a search criterion as the preceding search term is matched by the data stream 12, or if the search term is unmatched, the finite state machines may begin searching for the first search term of the search criterion.

The pattern-recognition processor 14 may evaluate each new term according to several search criteria, and their respective search terms, at about the same time, e.g., during a single device cycle. The parallel finite state machines may each receive the term from the data stream 12 at about the same time, and each of the parallel finite state machines may determine whether the term advances the parallel finite state machine to the next search term in its search criterion. The parallel finite state machines may evaluate terms according to a relatively large number of search criteria, e.g., more than 100, more than 1000, or more than 10,000. Because they operate in parallel, they may apply the search criteria to a data stream 12 having a relatively high bandwidth, e.g., a data stream 12 of greater than or generally equal to 64 MB per second or 128 MB per second, without slowing the data stream. In some embodiments, the search-cycle duration does not scale with the number of search criteria, so the number of search criteria may have little to no effect on the performance of the pattern-recognition processor 14.

When a search criterion is satisfied (i.e., after advancing to the last search term and matching it), the pattern-recognition processor 14 may report the satisfaction of the criterion to a processing unit, such as a central processing unit (CPU) 20. The central processing unit 20 may control the pattern-recognition processor 14 and other portions of the system 10.

The system 10 may be any of a variety of systems or devices that search a stream of data. For example, the system 10 may be a desktop, laptop, handheld or other type of computer that monitors the data stream 12. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

The data stream 12 may be one or more of a variety of types of data streams that a user or other entity might wish to search. For example, the data stream 12 may be a stream of data received over a network, such as packets received over the Internet or voice or data received over a cellular network. The data stream 12 may be data received from a sensor in communication with the system 10, such as an imaging sensor, a temperature sensor, an accelerometer, or the like, or combinations thereof. The data stream 12 may be received by the system 10 as a serial data stream, in which the data is received in an order that has meaning, such as in a temporally, lexically, or semantically significant order. Or the data stream 12 may be received in parallel or out of order and, then, converted into a serial data stream, e.g., by reordering packets received over the Internet. In some embodiments, the data stream 12 may present terms serially, but the bits expressing each of the terms may be received in parallel. The data stream 12 may be received from a source external to the system 10, or may be formed by interrogating a memory device and forming the data stream 12 from stored data.

Depending on the type of data in the data stream 12, different types of search criteria may be chosen by a designer. For instance, the search criteria 16 may be a virus definition file. Viruses or other malware may be characterized, and aspects of the malware may be used to form search criteria that indicate whether the data stream 12 is likely delivering malware. The resulting search criteria may be stored on a server, and an operator of a client system may subscribe to a service that downloads the search criteria to the system 10. The search criteria 16 may be periodically updated from the server as different types of malware emerge. The search criteria may also be used to specify undesirable content that might be received over a network, for instance unwanted emails (commonly known as spam) or other content that a user finds objectionable.

The data stream 12 may be searched by a third party with an interest in the data being received by the system 10. For example, the data stream 12 may be monitored for text, a sequence of audio, or a sequence of video that occurs in a copyrighted work. The data stream 12 may be monitored for utterances that are relevant to a criminal investigation or civil proceeding or are of interest to an employer.

The search criteria 16 may also include patterns in the data stream 12 for which a translation is available, e.g., in memory addressable by the CPU 20 or the pattern-recognition processor 14. For instance, the search criteria 16 may each specify an English word for which a corresponding Spanish word is stored in memory. In another example, the search criteria 16 may specify encoded versions of the data stream 12, e.g., MP3, MPEG 4, FLAC, Ogg Vorbis, etc., for which a decoded version of the data stream 12 is available, or vice versa.

The pattern-recognition processor 14 may be hardware that is integrated with the CPU 20 into a single component (such as a single device) or may be formed as a separate component. For instance, the pattern-recognition processor 14 may be a separate integrated circuit. The pattern-recognition processor 14 may be referred to as a "co-processor" or a "pattern-recognition co-processor".

Figure 2:
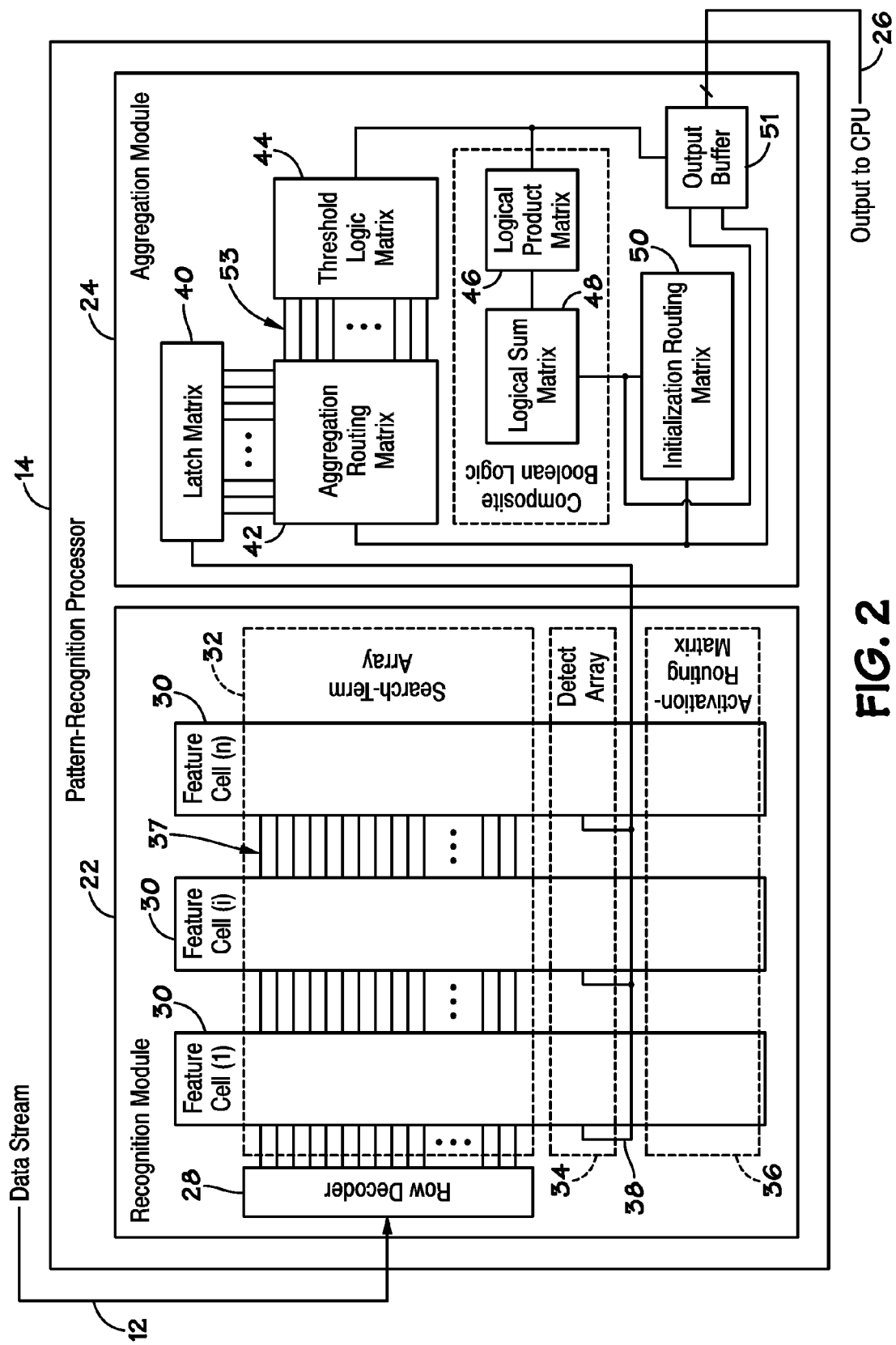
FIG. 2 depicts an example of a pattern-recognition processor in the system of FIG. 1.

FIG. 2 depicts an example of the pattern-recognition processor 14. The pattern-recognition processor 14 may include a recognition module 22 and an aggregation module 24. The recognition module 22 may be configured to compare received terms to search terms, and both the recognition module 22 and the aggregation module 24 may cooperate to determine whether matching a term with a search term satisfies a search criterion.

The recognition module 22 may include a row decoder 28 and a plurality of feature cells 30. Each feature cell 30 may specify a search term, and groups of feature cells 30 may form a parallel finite state machine that forms a search criterion. Components of the feature cells 30 may form a search-term array 32, a detection array 34, and an activation-routing matrix 36. The search-term array 32 may include a plurality of input conductors 37, each of which may place each of the feature cells 30 in communication with the row decoder 28.

The row decoder 28 may select particular conductors among the plurality of input conductors 37 based on the content of the data stream 12. For example, the row decoder 28 may be a one byte to 256 row decoder that activates one of 256 rows based on the value of a received byte, which may represent one term. A one-byte term of 0000 0000 may correspond to the top row among the plurality of input conductors 37, and a one-byte term of 1111 1111 may correspond to the bottom row among the plurality of input conductors 37. Thus, different input conductors 37 may be selected, depending on which terms are received from the data stream 12. As different terms are received, the row decoder 28 may deactivate the row corresponding to the previous term and activate the row corresponding to the new term.

The detection array 34 may couple to a detection bus 38 that outputs signals indicative of complete or partial satisfaction of search criteria to the aggregation module 24. The activation-routing matrix 36 may selectively activate and deactivate feature cells 30 based on the number of search terms in a search criterion that have been matched.

The aggregation module 24 may include a latch matrix 40, an aggregation-routing matrix 42, a threshold-logic matrix 44, a logical-product matrix 46, a logical-sum matrix 48, and an initialization-routing matrix 50.

The latch matrix 40 may implement portions of certain search criteria. Some search criteria, e.g., some regular expressions, count only the first occurrence of a match or group of matches. The latch matrix 40 may include latches that record whether a match has occurred. The latches may be cleared during initialization, and periodically re-initialized during operation, as search criteria are determined to be satisfied or not further satisfiable—i.e., an earlier search term may need to be matched again before the search criterion could be satisfied.

The aggregation-routing matrix 42 may function similar to the activation-routing matrix 36. The aggregation-routing matrix 42 may receive signals indicative of matches on the detection bus 38 and may route the signals to different group-logic lines 53 connecting to the threshold-logic matrix 44. The aggregation-routing matrix 42 may also route outputs of the initialization-routing matrix 50 to the detection array 34 to reset portions of the detection array 34 when a search criterion is determined to be satisfied or not further satisfiable.

The threshold-logic matrix 44 may include a plurality of counters, e.g., 32-bit counters configured to count up or down. The threshold-logic matrix 44 may be loaded with an initial count, and it may count up or down from the count based on matches signaled by the recognition module. For instance, the threshold-logic matrix 44 may count the number of occurrences of a word in some length of text.

The outputs of the threshold-logic matrix 44 may be inputs to the logical-product matrix 46. The logical-product matrix 46 may selectively generate "product" results (e.g., "AND" function in Boolean logic). The logical-product matrix 46 may be implemented as a square matrix, in which the number of output products is equal the number of input lines from the threshold-logic matrix 44, or the logical-product matrix 46 may have a different number of inputs than outputs. The resulting product values may be output to the logical-sum matrix 48.

The logical-sum matrix 48 may selectively generate sums (e.g., "OR" functions in Boolean logic.) The logical-sum matrix 48 may also be a square matrix, or the logical-sum matrix 48 may have a different number of inputs than outputs. Since the inputs are logical products, the outputs of the logical-sum matrix 48 may be logical-Sums-of-Products (e.g., Boolean logic Sum-of-Product (SOP) form). The output of the logical-sum matrix 48 may be received by the initialization-routing matrix 50.

The initialization-routing matrix 50 may reset portions of the detection array 34 and the aggregation module 24 via the aggregation-routing matrix 42. The initialization-routing matrix 50 may also be implemented as a square matrix, or the initialization-routing matrix 50 may have a different number of inputs than outputs. The initialization-routing matrix 50 may respond to signals from the logical-sum matrix 48 and re-initialize other portions of the pattern-recognition processor 14, such as when a search criterion is satisfied or determined to be not further satisfiable.

The aggregation module 24 may include an output buffer 51 that receives the outputs of the threshold-logic matrix 44, the aggregation-routing matrix 42, and the logical-sum matrix 48. The output of the aggregation module 24 may be transmitted from the output buffer 51 to the CPU 20 (FIG. 1) on the output bus 26. In some embodiments, an output multiplexer may multiplex signals from these components 42, 44, and 48 and output signals indicative of satisfaction of criteria or matches of search terms to the CPU 20 (FIG. 1). In other embodiments, results from the pattern-recognition processor 14 may be reported without transmitting the signals through the output multiplexer, which is not to suggest that any other feature described herein could not also be omitted. For example, signals from the threshold-logic matrix 44, the logical-product matrix 46, the logical-sum matrix 48, or the initialization routing matrix 50 may be transmitted to the CPU in parallel on the output bus 26.

Figure 3:
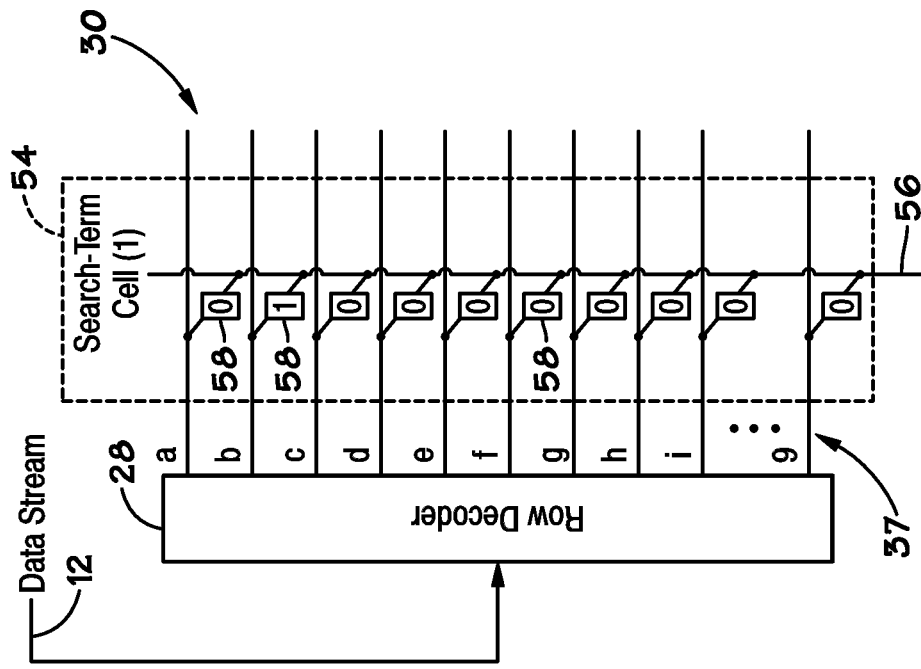
FIG. 3 depicts an example of a search-term cell in the pattern-recognition processor of FIG. 2.

FIG. 3 illustrates a portion of a single feature cell 30 in the search-term array 32 (FIG. 2), a component referred to herein as a search-term cell 54. The search-term cells 54 may include an output conductor 56 and a plurality of memory cells 58. Each of the memory cells 58 may be coupled to both the output conductor 56 and one of the conductors among the plurality of input conductors 37. In response to its input conductor 37 being selected, each of the memory cells 58 may output a value indicative of its stored value, outputting the data through the output conductor 56. In some embodiments, the plurality of input conductors 37 may be referred to as "word lines", and the output conductor 56 may be referred to as a "data line".

The memory cells 58 may include any of a variety of types of memory cells. For example, the memory cells 58 may be volatile memory, such as dynamic random access memory (DRAM) cells having a transistor and a capacitor. The source and the drain of the transistor may be connected to a plate of the capacitor and the output conductor 56, respectively, and the gate of the transistor may be connected to one of the input conductors 37. In another example of volatile memory, each of the memory cells 58 may include a static random access memory (SRAM) cell. The SRAM cell may have an output that is selectively coupled to the output conductor 56 by an access transistor controlled by one of the input conductors 37. The memory cells 58 may also include nonvolatile memory, such as phase-change memory (e.g., an ovonic device), flash memory, siliconoxide-nitride-oxide-silicon (SONOS) memory, magneto-resistive memory, or other types of nonvolatile memory. The memory cells 58 may also include flip-flops, e.g., memory cells made out of logic gates.

Figure 5:
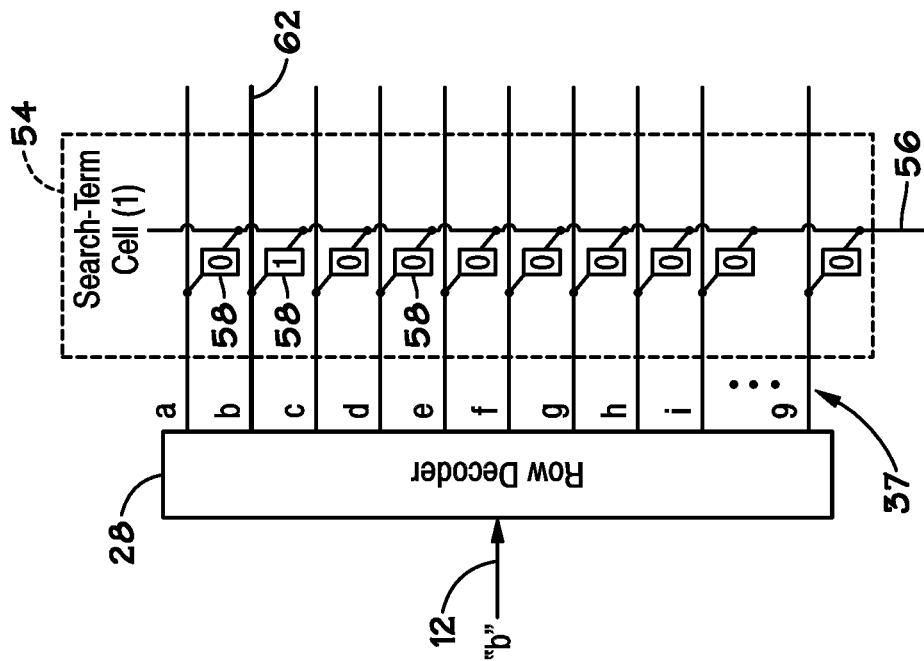
FIGS. 4 and 5 depict the search-term cell of FIG. 3 searching the data stream for a single character.
Figure 4:
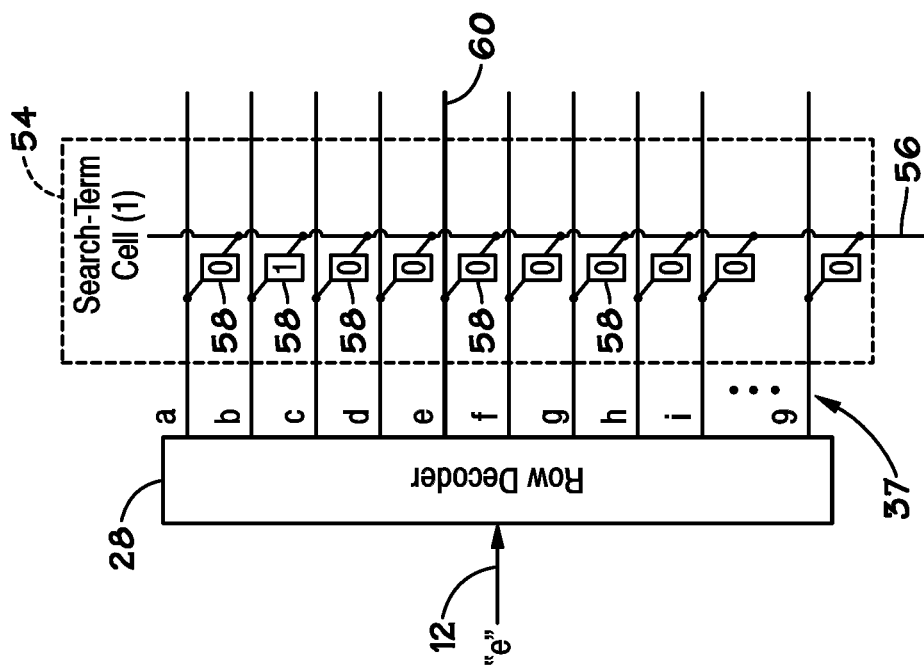

FIGS. 4 and 5 depict an example of the search-term cell 54 in operation. FIG. 4 illustrates the search-term cell 54 receiving a term that does not match the cell's search term, and FIG. 5 illustrates a match.

As illustrated by FIG. 4, the search-term cell 54 may be configured to search for one or more terms by storing data in the memory cells 58. The memory cells 58 may each represent a term that the data stream 12 might present, e.g., in FIG. 3, each memory cell 58 represents a single letter or number, starting with the letter "a" and ending with the number "9". Memory cells 58 representing terms that satisfy the search term may be programmed to store a first value, and memory cells 58 that do not represent terms that satisfy the search term may be programmed to store a different value. In the illustrated example, the search-term cell 54 is configured to search for the letter "b". The memory cells 58 that represent "b" may store a 1, or logic high, and the memory cells 58 that do not represent "b" may be programmed to store a 0, or logic low.

To compare a term from the data stream 12 with the search term, the row decoder 28 may select the input conductor 37 coupled to memory cells 58 representing the received term. In FIG. 4, the data stream 12 presents a lowercase "e". This term may be presented by the data stream 12 in the form of an eight-bit ASCII code, and the row decoder 28 may interpret this byte as a row address, outputting a signal on the conductor 60 by energizing it.

In response, the memory cell 58 controlled by the conductor 60 may output a signal indicative of the data that the memory cell 58 stores, and the signal may be conveyed by the output conductor 56. In this case, because the letter "e" is not one of the terms specified by the search-term cell 54, it does not match the search term, and the search-term cell 54 outputs a 0 value, indicating no match was found.

In FIG. 5, the data stream 12 presents a character "b". Again, the row decoder 28 may interpret this term as an address, and the row decoder 28 may select the conductor 62. In response, the memory cell 58 representing the letter "b" outputs its stored value, which in this case is a 1, indicating a match.

The search-term cells 54 may be configured to search for more than one term at a time. Multiple memory cells 58 may be programmed to store a 1, specifying a search term that matches with more than one term. For instance, the memory cells 58 representing the letters lowercase "a" and uppercase "A" may be programmed to store a 1, and the search-term cell 54 may search for either term. In another example, the search-term cell 54 may be configured to output a match if any character is received. All of the memory cells 58 may be programmed to store a 1, such that the search-term cell 54 may function as a wildcard term in a search criterion.

Figure 6:
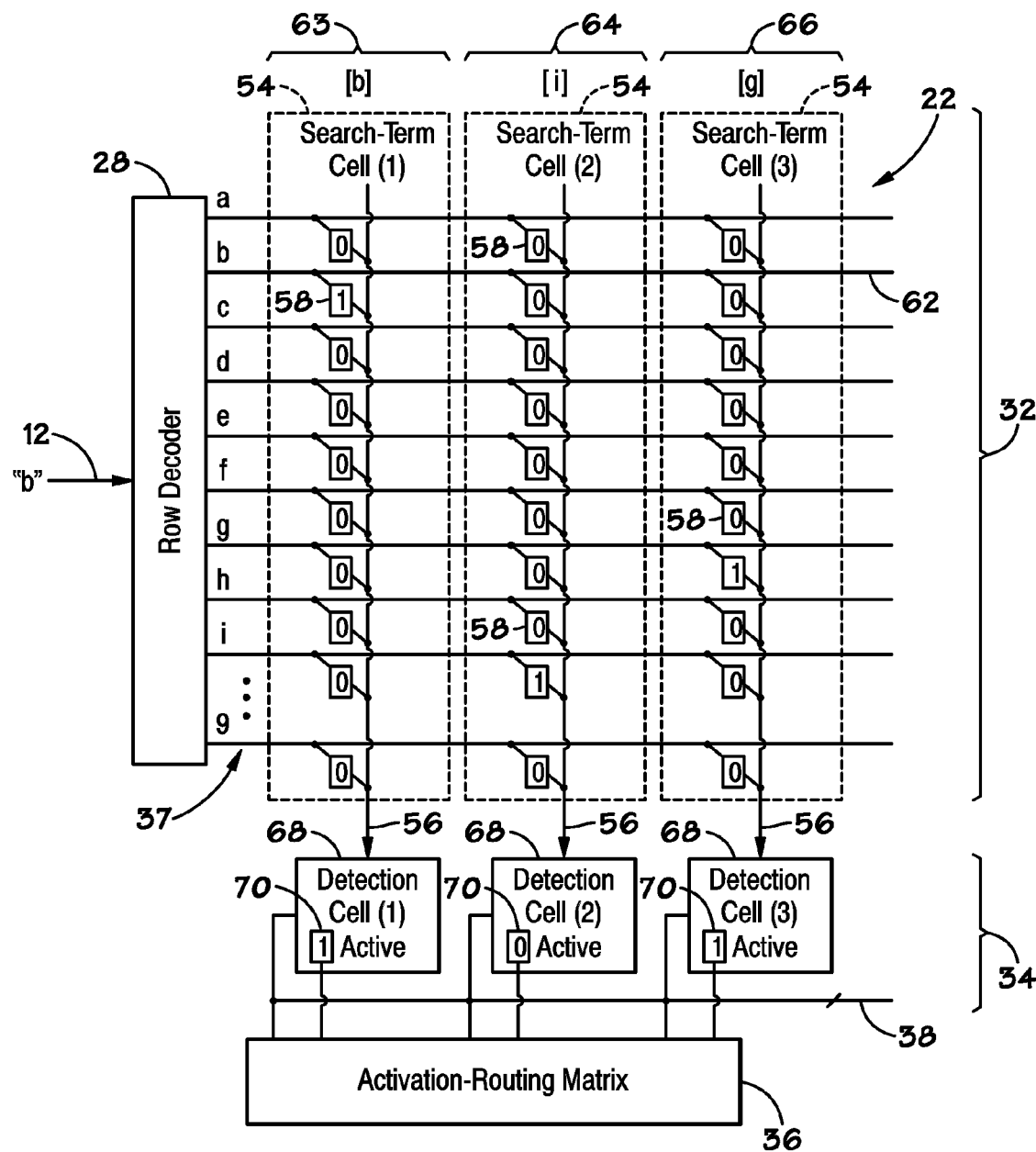
FIGS. 6-8 depict a recognition module including several search-term cells searching the data stream for a word.
Figure 7:
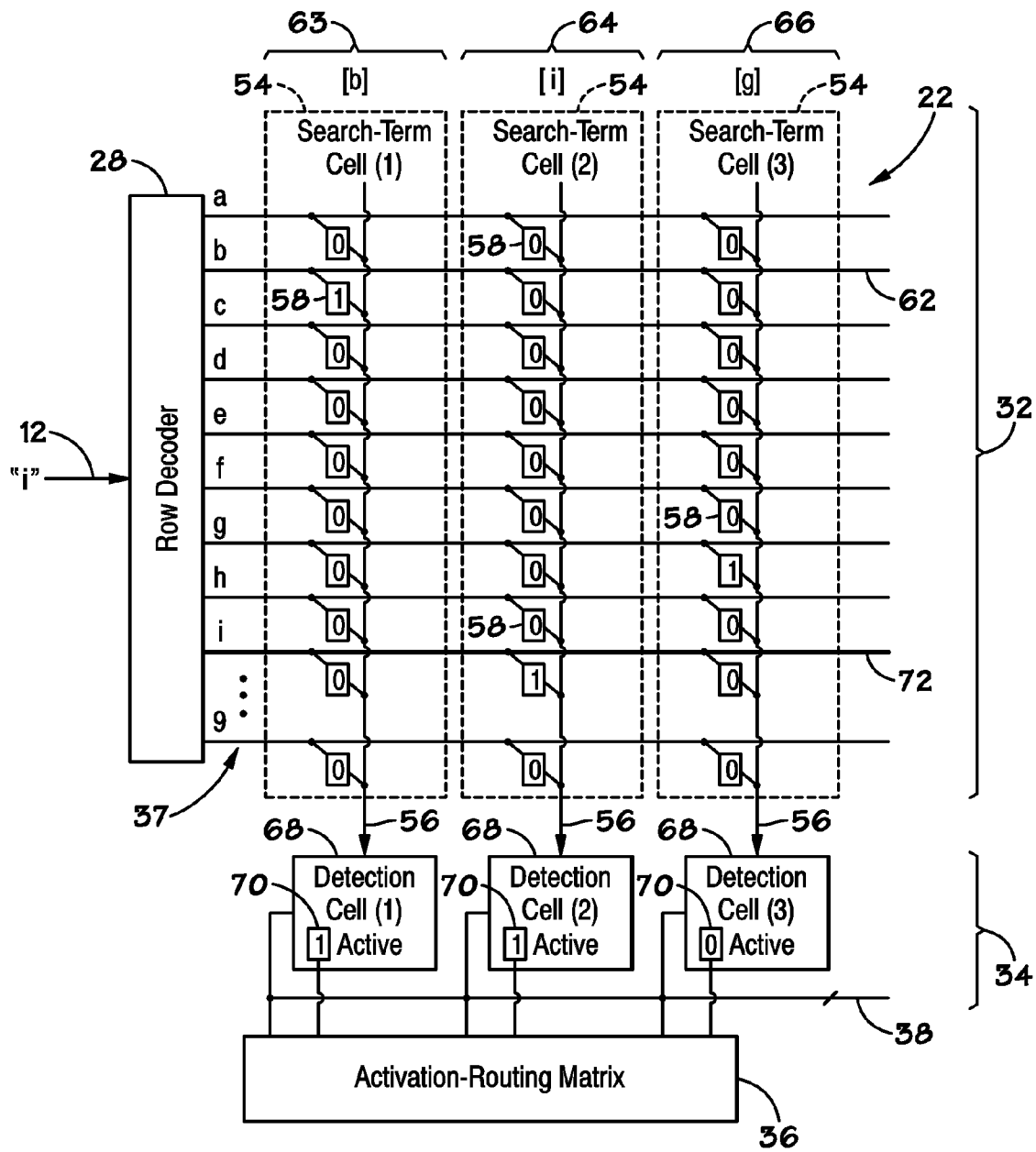
Figure 8:
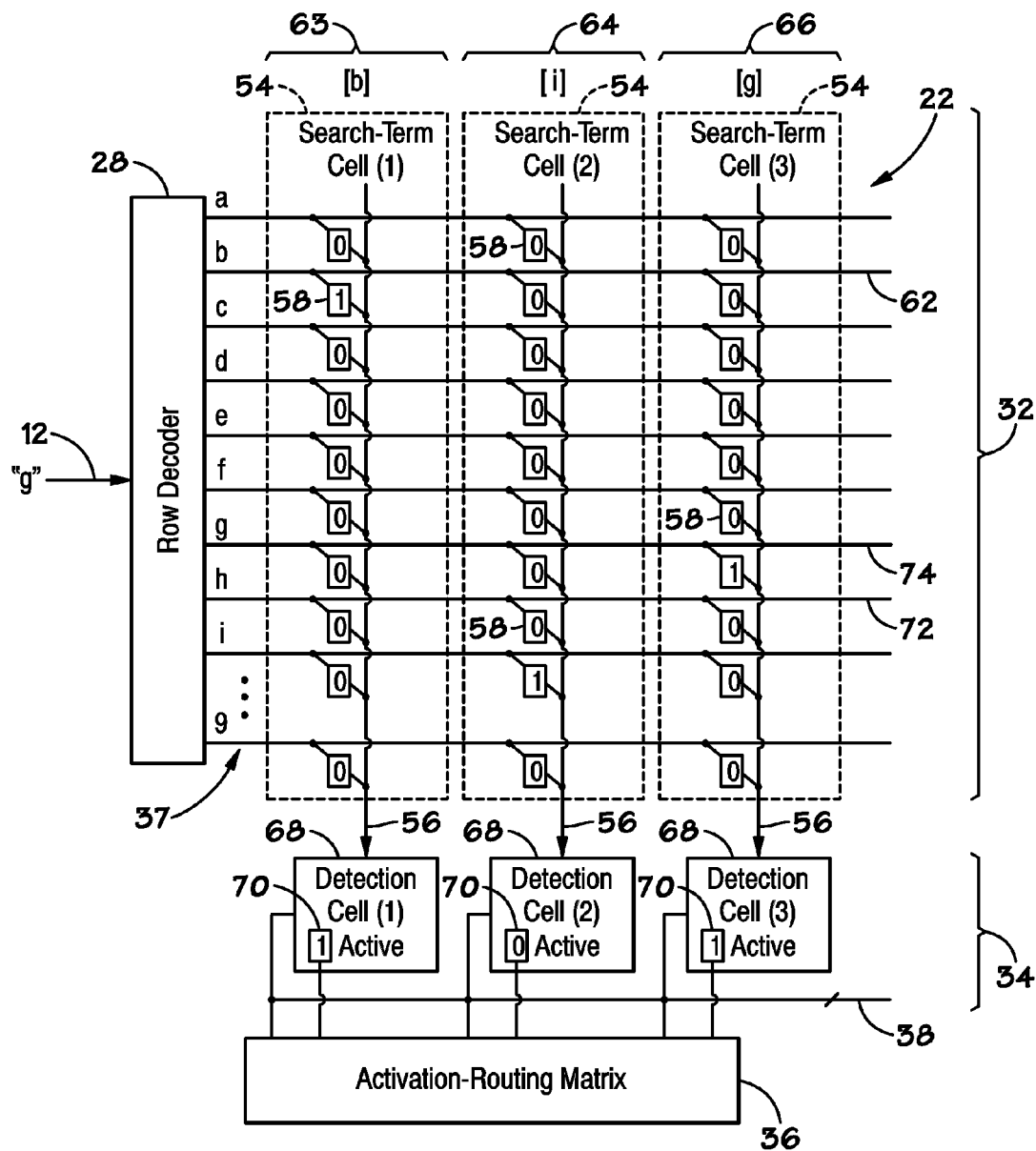

FIGS. 6-8 depict the recognition module 22 searching according to a multi-term search criterion, e.g., for a word. Specifically, FIG. 6 illustrates the recognition module 22 detecting the first letter of a word, FIG. 7 illustrates detection of the second letter, and FIG. 8 illustrates detection of the last letter.

As illustrated by FIG. 6, the recognition module 22 may be configured to search for the word "big". Three adjacent feature cells 63, 64, and 66 are illustrated. The feature cell 63 is configured to detect the letter "b". The feature cell 64 is configured to detect the letter "i". And the feature cell 66 is configured to both detect the letter "g" and indicate that the search criterion is satisfied.

FIG. 6 also depicts additional details of the detection array 34. The detection array 34 may include a detection cell 68 in each of the feature cells 63, 64, and 66. Each of the detection cells 68 may include a memory cell 70, such as one of the types of memory cells described above (e.g., a flip-flop), that indicates whether the feature cell 63, 64, or 66 is active or inactive. The detection cells 68 may be configured to output a signal to the activation-routing matrix 36 indicating whether the detection cell both is active and has received a signal from its associated search-term cell 54 indicating a match. Inactive features cells 63, 64, and 66 may disregard matches. Each of the detection cells 68 may include an AND gate with inputs from the memory cell 70 and the output conductor 56. The output of the AND gate may be routed to both the detection bus 38 and the activation-routing matrix 36, or one or the other.

The activation-routing matrix 36, in turn, may selectively activate the feature cells 63, 64, and 66 by writing to the memory cells 70 in the detection array 34. The activation-routing matrix 36 may activate feature cells 63, 64, or 66 according to the search criterion and which search term is being searched for next in the data stream 12.

In FIG. 6, the data stream 12 presents the letter "b". In response, each of the feature cells 63, 64, and 66 may output a signal on their output conductor 56, indicating the value stored in the memory cell 58 connected to the conductor 62, which represents the letter "b". The detection cells 56 may then each determine whether they have received a signal indicating a match and whether they are active. Because the feature cell 63 is configured to detect the letter "b" and is active, as indicated by its memory cell 70, the detection cell 68 in the feature cell 63 may output a signal to the activation-routing matrix 36 indicating that the first search term of the search criterion has been matched.

As illustrated by FIG. 7, after the first search term is matched, the activation-routing matrix 36 may activate the next feature cell 64 by writing a 1 to its memory cell 70 in its detection cell 68. The activation-routing matrix 36 may also maintain the active state of the feature cell 63, in case the next term satisfies the first search term, e.g., if the sequence of terms "bbig" is received. The first search term of search criteria may be maintained in an active state during a portion or substantially all of the time during which the data stream 12 is searched.

In FIG. 7, the data stream 12 presents the letter "i" to the recognition module 22. In response, each of the feature cells 63, 64, and 66 may output a signal on their output conductor 56, indicating the value stored in the memory cell 58 connected to the conductor 72, which represents the letter "i". The detection cells 56 may then each determine whether they have received a signal indicating a match and whether they are active. Because the feature cell 64 is configured to detect the letter "i" and is active, as indicated by its memory cell 70, the detection cell 68 in the feature cell 64 may output a signal to the activation-routing matrix 36 indicating that the next search term of its search criterion has been matched.

Next, the activation-routing matrix 36 may activate the feature cell 66, as illustrated by FIG. 8. Before evaluating the next term, the feature cell 64 may be deactivated. The feature cell 64 may be deactivated by its detection cell 68 resetting its memory cell 70 between detection cycles or the activation-routing matrix 36 may deactivate the feature cell 64, for example.

In FIG. 8, the data stream 12 presents the term "g" to the row decoder 28, which selects the conductor 74 representing the term "g". In response, each of the feature cells 63, 64, and 66 may output a signal on their output conductor 56, indicating the value stored in the memory cell 58 connected to the conductor 74, which represents the letter "g". The detection cells 56 may then each determine whether they have received a signal indicating a match and whether they are active. Because the feature cell 66 is configured to detect the letter "g" and is active, as indicated by its memory cell 70, the detection cell 68 in the feature cell 66 may output a signal to the activation routing matrix 36 indicating that the last search term of its search criterion has been matched.

The end of a search criterion or a portion of a search criterion may be identified by the activation-routing matrix 36 or the detection cell 68. These components 36 or 68 may include memory indicating whether their feature cell 63, 64, or 66 specifies the last search term of a search criterion or a component of a search criterion. For example, a search criterion may specify all sentences in which the word "cattle" occurs twice, and the recognition module may output a signal indicating each occurrence of "cattle" within a sentence to the aggregation module, which may count the occurrences to determine whether the search criterion is satisfied.

Feature cells 63, 64, or 66 may be activated under several conditions. A feature cell 63, 64, or 66 may be "always active", meaning that it remains active during all or substantially all of a search. An example of an always active feature cell 63, 64, or 66 is the first feature cell of the search criterion, e.g., feature cell 63.

A feature cell 63, 64, or 66 may be "active when requested", meaning that the feature cell 63, 64, or 66 is active when some condition precedent is matched, e.g., when the preceding search terms in a search criterion are matched. An example is the feature cell 64, which is active when requested by the feature cell 63 in FIGS. 6-8, and the feature cell 66, which active when requested by the feature cell 64.

A feature cell 63, 64, or 66 may be "self activated", meaning that once it is activated, it activates itself as long as its search term is matched. For example, a self activated feature cell having a search term that is matched by any numerical digit may remain active through the sequence "123456xy" until the letter "x" is reached. Each time the search term of the self activated feature cell is matched, it may activate the next feature cell in the search criterion. Thus, an always active feature cell may be formed from a self activating feature cell and an active when requested feature cell: the self activating feature cell may be programmed with all of its memory cells 58 storing a 1, and it may repeatedly activate the active when requested feature cell after each term. In some embodiments, each feature cell 63, 64, and 66 may include a memory cell in its detection cell 68 or in the activation-routing matrix 36 that specifies whether the feature cell is always active, thereby forming an always active feature cell from a single feature cell.

Figure 9:
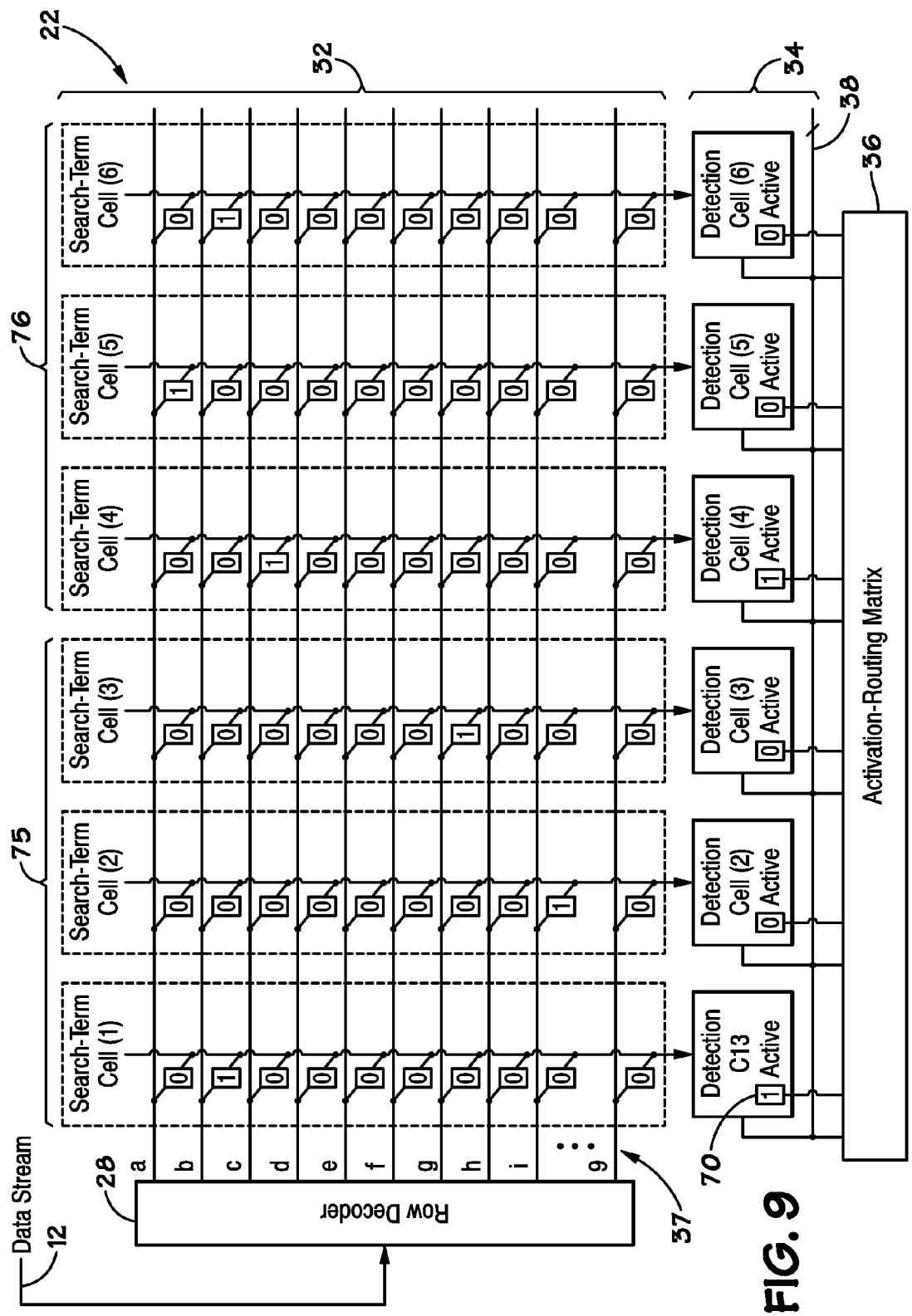
FIG. 9 depicts the recognition module configured to search the data stream for two words in parallel.

FIG. 9 depicts an example of a recognition module 22 configured to search according to a first search criterion 75 and a second search criterion 76 in parallel. In this example, the first search criterion 75 specifies the word "big", and the second search criterion 76 specifies the word "cab". A signal indicative of the current term from the data stream 12 may be communicated to feature cells in each search criterion 75 and 76 at generally the same time. Each of the input conductors 37 spans both of the search criteria 75 and 76. As a result, in some embodiments, both of the search criteria 75 and 76 may evaluate the current term generally simultaneously. This is believed to speed the evaluation of search criteria. Other embodiments may include more feature cells configured to evaluate more search criteria in parallel. For example, some embodiments may include more than 100, 500, 1000, 5000, or 10,000 feature cells operating in parallel. These feature cells may evaluate hundreds or thousands of search criteria generally simultaneously.

Search criteria with different numbers of search terms may be formed by allocating more or fewer feature cells to the search criteria. Simple search criteria may consume fewer resources in the form of feature cells than complex search criteria. This is believed to reduce the cost of the pattern-recognition processor 14 (FIG. 2) relative to processors with a large number of generally identical cores, all configured to evaluate complex search criteria.

Figure 10:
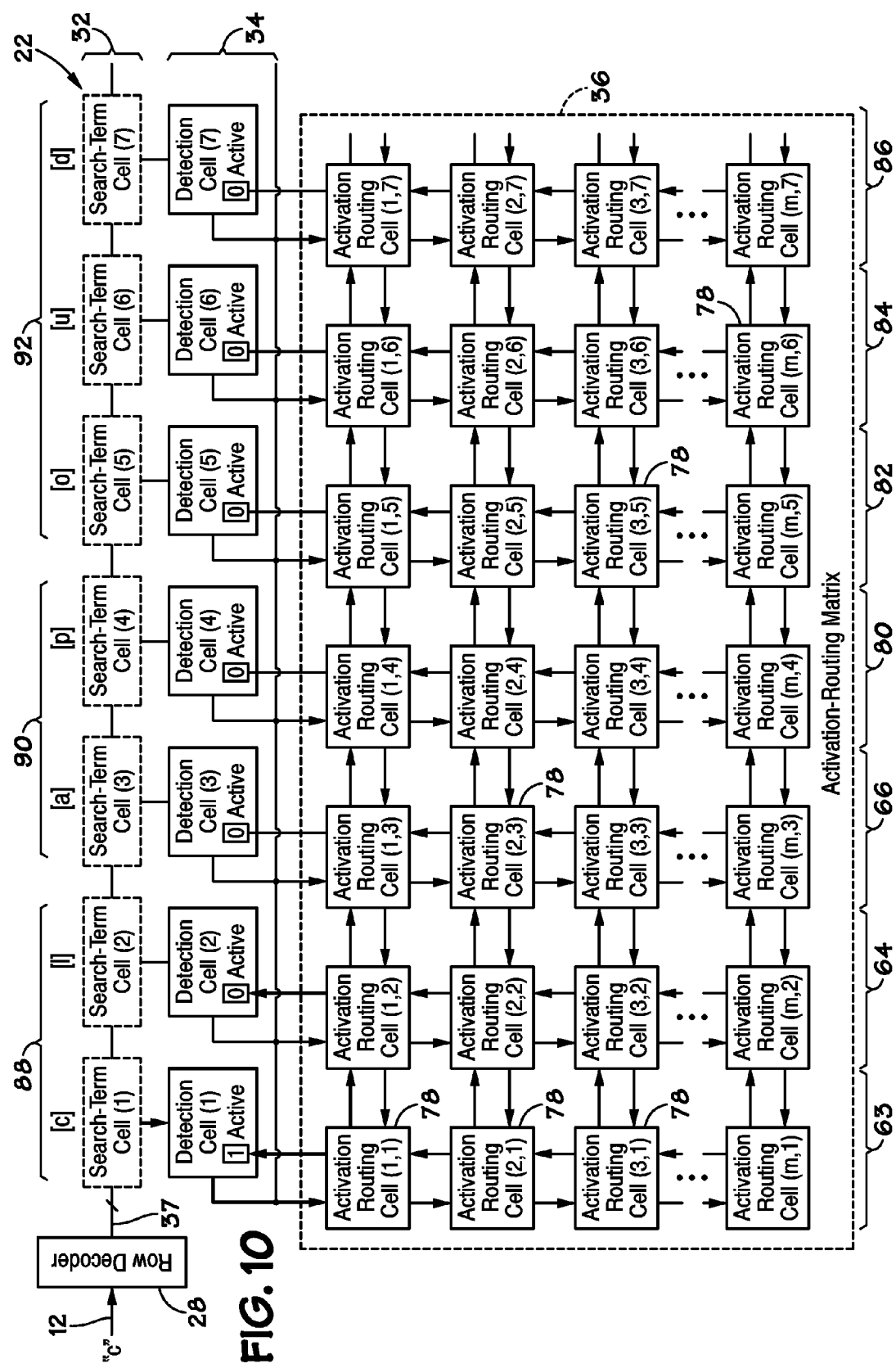
FIGS. 10-12 depict the recognition module searching according to a search criterion that specifies multiple words with the same prefix.
Figure 11:
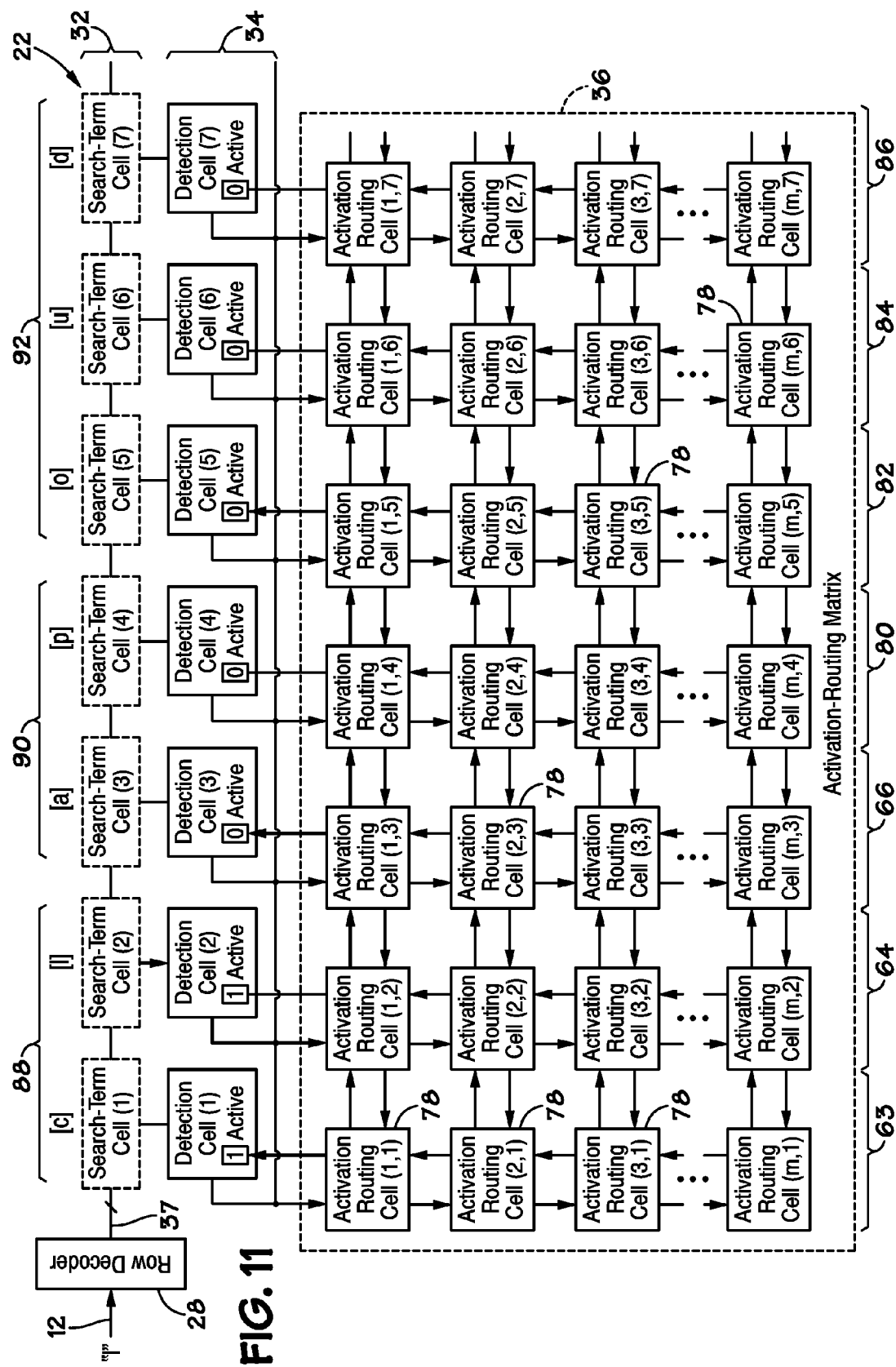
Figure 12:
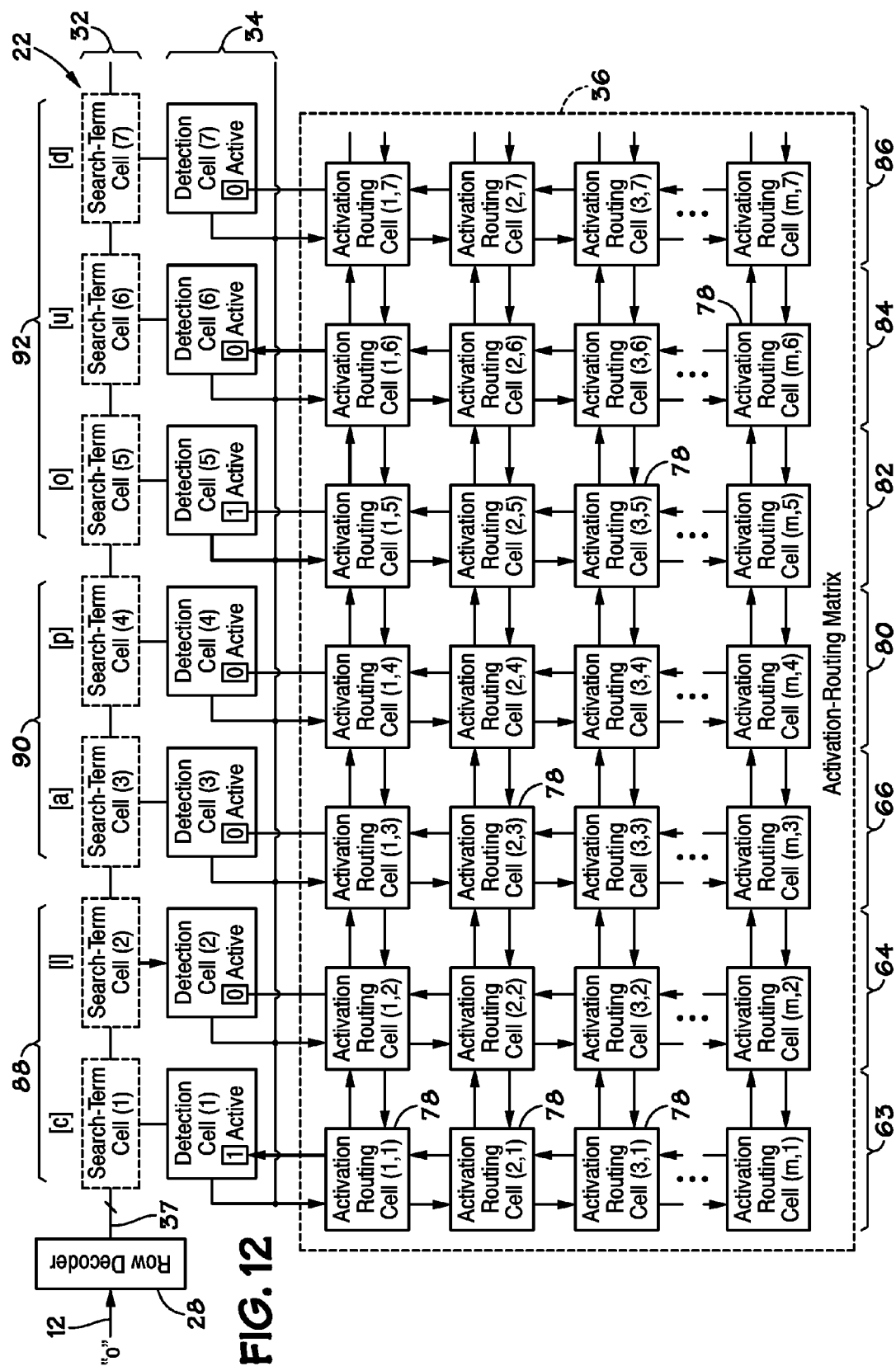

FIGS. 10-12 depict both an example of a more complex search criterion and features of the activation-routing matrix 36. The activation-routing matrix 36 may include a plurality of activation-routing cells 78, groups of which may be associated with each of the feature cells 63, 64, 66, 80, 82, 84, and 86. For instance, each of the feature cells may include 5, 10, 20, 50, or more activation-routing cells 78. The activation-routing cells 78 may be configured to transmit activation signals to the next search term in a search criterion when a preceding search term is matched. The activation-routing cells 78 may be configured to route activation signals to adjacent feature cells or other activation-routing cells 78 within the same feature cell. The activation-routing cells 78 may include memory that indicates which feature cells correspond to the next search term in a search criterion.

As illustrated by FIGS. 10-12, the recognition module 22 may be configured to search according to complex search criteria than criteria that specify single words. For instance, the recognition module 22 may be configured to search for words beginning with a prefix 88 and ending with one of two suffixes 90 or 92. The illustrated search criterion specifies words beginning with the letters "c" and "l" in sequence and ending with either the sequence of letters "ap" or the sequence of letters "oud". This is an example of a search criterion specifying multiple target expressions, e.g., the word "clap" or the word "cloud".

In FIG. 10, the data stream 12 presents the letter "c" to the recognition module 22, and feature cell 63 is both active and detects a match. In response, the activation-routing matrix 36 may activate the next feature cell 64. The activation-routing matrix 36 may also maintain the active state of the feature cell 63, as the feature cell 63 is the first search term in the search criterion.

In FIG. 11, the data stream 12 presents a letter "l", and the feature cell 64 recognizes a match and is active. In response, the activation-routing matrix 36 may transmit an activation signal both to the first feature cell 66 of the first suffix 90 and to the first feature cell 82 of the second suffix 92. In other examples, more suffixes may be activated, or multiple prefixes may active one or more suffixes.

Next, as illustrated by FIG. 12, the data stream 12 presents the letter "o" to the recognition module 22, and the feature cell 82 of the second suffix 92 detects a match and is active. In response, the activation-routing matrix 36 may activate the next feature cell 84 of the second suffix 92. The search for the first suffix 90 may die out, as the feature cell 66 is allowed to go inactive. The steps illustrated by FIGS. 10-12 may continue through the letters "u" and "d", or the search may die out until the next time the prefix 88 is matched.

As described above, the pattern-recognition processor 14 may receive and process the data stream 12, such as by searching the data stream for a pattern according to a search criteria 16, using the feature cells 30 to specify search terms. The data stream 12 may be transferred as units of data, e.g., data packets, to the pattern-recognition processor 14. The data stream 12 may include any sequence of multiplexed data packets from one or more multiple data sources. Thus, packets in the data stream 12 received by the pattern-recognition processor 14 may be mixed among other packets from other data sources. That is, although the pattern-recognition processor 14 may receive packets from multiple data sources, the packets from each data source may be received by the pattern-recognition processor 14 in a mixed stream of packets, such that no two consecutive packets are guaranteed to belong to a single data source. Further, the packets for each data stream may be received by the pattern-recognition processor 14 in no specific order.

The data (e.g., packets) originating from one data source and received by the pattern-recognition processor 14 may be referred to as a "data flow." In any given embodiment, multiple data flows from multiple data sources may be received by the pattern-recognition processor 14, such that packets from each data flow are multiplexed and transmitted as data stream 12. Thus, the pattern-recognition processor 14 may receive consecutive packets in which each packet is from a different data flow. Additionally, the packets in a data flow may be received "out-of-order," such that the packets are not received in the original sequentially transmitted order. Each data flow may include a variable number of packets and each packet having a variable length.

For a set of search criteria 16, the pattern-recognition processor 14 may search for a pattern according to the search criteria 16 in only a single data flow. Thus, during processing of packets of a first data flow, if the next packet(s) received by the pattern-recognition processor 14 belong to a second data flow, the pattern-recognition processor 14 may stop and save processing of the first data flow and switch to processing the second data flow. Because each data flow is not complete until all packets are received, the pattern-recognition processor 14 may execute multiple saving and restoring cycles (also referred to as switching "contexts") between the first data flow and the second data flow (or, possibly a third, data flow, fourth data flow, or any number of data flows).

As described above, the recognition module 22 includes any number of finite state machines (formed by groups of feature cells 30) that progress through a sequence of transitions, from state to state, as matches are found or not found in the terms of a data flow received in the data stream 12. Such searches start with an initial assumed state and then transition to other states as the terms are processed. The term "search state" refers to the set of data that uniquely specifies the exact position of the finite state machines (e.g., groups of feature cells 30) of the recognition module 22. For example, in an embodiment having a 256K feature cell processor, there are in excess of 300,000 bits used to specify the search state. As described further below, the pattern-recognition processor 14 may save and restore search states, for each data flow, during processing of the data stream 12.

Figure 13:
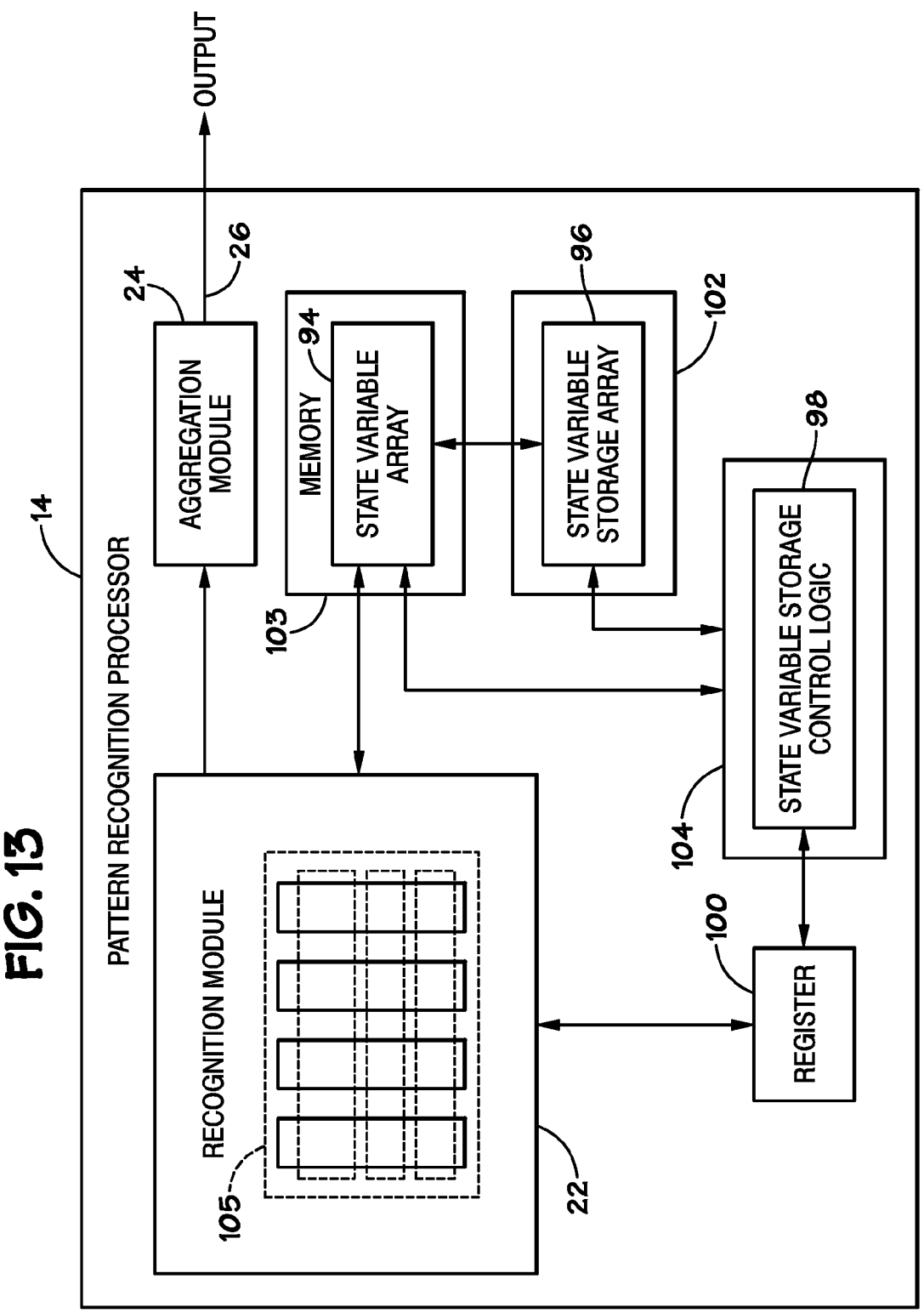
FIG. 13 depicts a state variable storage array and other related components of the pattern-recognition processor of FIG. 2.

FIG. 13 depicts a state variable array 94 and a state variable storage array 96 of the pattern-recognition processor 14 in accordance with an embodiment of the present invention. The state variable array 94 is used for the operation of the pattern-recognition processor; whereas the state variable storage array 96 is used to store state variables of a search state (e.g., intermediate results associated with particular data flows), while processing a different data flow. The pattern-recognition processor 14 may include state variable storage control logic 98 to control the saving and restoring of states between the state variable array 94 and state variable storage array 96. In some embodiments, operation of the state variable storage control logic 98 (and any other components of the pattern-recognition processor 14, such as the recognition module 22 and aggregation module 24) may be partially or fully controlled via registers 100. For example, the registers 100 may provide control data to indicate various actions to be taken by the state variable control logic 98.

The state variable storage array 96 may be stored in on-chip memory 102 of the pattern-recognition processor 14. The state variable array 94 may be stored in an additional on-chip memory 103 of the pattern-recognition processor 14. In some embodiments, the on-chip memory 102 may be designed for the complete and sometimes large capacity used by the state variable storage array 96 and may be separate from the on chip memory 103 designed for the state variable array 94. In other embodiments, the on-chip memory 102 and on-chip memory 103 may be the same type or a part of the same on-chip memory array.

For example, on-chip memory 102 may be implemented in SRAM, DRAM, or flip-flop memory; the on-chip memory 103 may also be implemented in SRAM, DRAM, or flip-flop memory; 102 and 103 may be implemented in the same memory array or separate arrays. On-chip memory may refer to "on-silicon" memory, such that the memory storing the state variable storage array 94 and/or the state variable storage array 96 are fabricated on the same silicon as the pattern-recognition processor 14. On-chip memory may also refer to a "multi-chip" module, or some other form of product, that offers similar performance to memory fabricated on the same silicon as the pattern-recognition processor 14.

The state variable storage control logic may be stored in memory 104, which may be separate from or a part of the on-chip memory 102 and/or 103. Advantageously, as discussed further below, storing the state of the pattern-recognition processor 14 in the on-chip memory 102 (using the state variable storage array 96) facilitates fast saving, restoring, and switching of states of the pattern-recognition processor 14 when switching between data flows. The saving of a state, and the restoring of a state, may be performed in a single cycle of the pattern-recognition processor 14. The state variable storage control logic 98 may use control data stored in the registers 100 for determination of control parameters, such as when to save a state to the state variable storage array 96, when to load a state from the state variable storage array 96, etc.

As described above, groups of the feature cells 30 of the recognition module 22 may effectively comprise different state machines, e.g., state machine 105 (and, as described above, the recognition module may include any number of feature cells 30 and state machines). During processing of a data flow (referred to as "normal operation"), such as from data stream 12, the recognition module 22 may read and write state variables to and from the state variable array 94. State variables may include flow identifiers, counters, or any other suitable state variable that used in processing a data flow of the pattern-recognition processor 14 and operation of the state machine 105.

Figure 14:
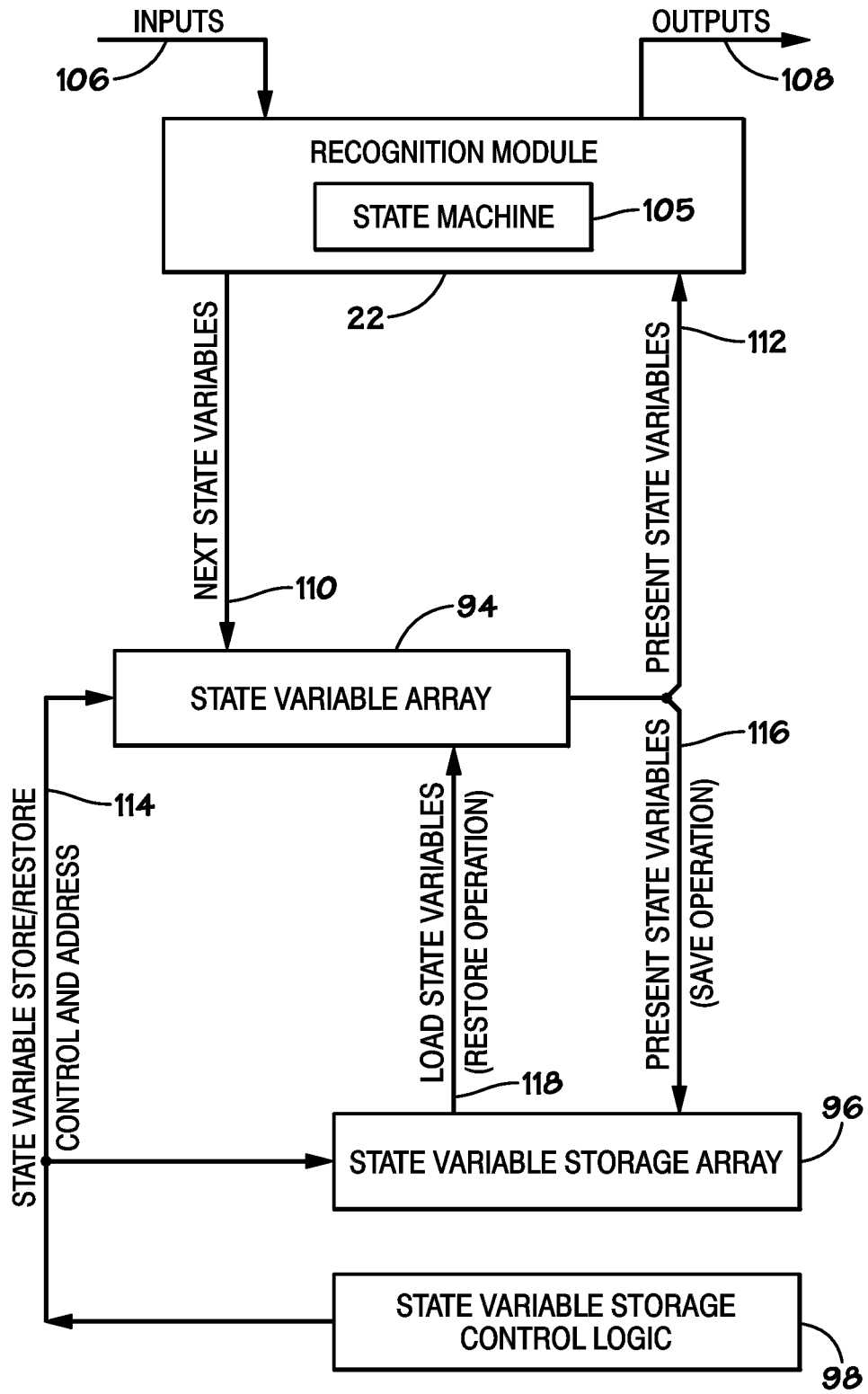
FIG. 14 is a block diagram of the operation of the state variable storage array of FIG. 13 and related components.

FIG. 14 is a block diagram illustrating saving and restoring a state from a state machine 105 (e.g., group of feature cells 30) contained in the recognition module 22 of the pattern-recognition processor 14. The recognition module 22 may receive inputs 106, such as a data flow from the data stream 12, and may produce outputs 108, such as matches between terms of the data flow and search terms to the aggregation module 24. The recognition module 22 may write state variables of the active flow (also referred to as the "present" state or "search state" variables) to the state variable array 94 (as shown by arrow 110) and may read present state variables from the state variable array 94 (as shown by arrow 112).

During normal operation, a request to switch data flows may be received by the pattern-recognition processor, such as through control via the registers 100. The state variable storage control logic 104 controls when a state is "saved," e.g., when present state variables are written to the state variable storage array 96, or "restored", e.g., when saved state variables are loaded from the state variable storage array 96 into the state variable array 94.

During a save operation, e.g., saving the state of the state machine 105 (the search state) for a particular data flow, the state variable storage control logic 98 may send control and address signals 114 to the state variable array 94 and the state variable storage array 96. The address signals may include a "save address" to indicate the location in which the state variables will be stored, e.g., the location in on-chip memory 102 that includes the state variable storage array 96 and/or the location within the state variable storage array 96. During this "save" operation, normal operation of the state machine 105 may be suspended and the present state variables of the present state are written from the state variable array 94 to the state variable storage array 96 (as shown by line 116). In some embodiments, the present state variables from the state variable array 94 may overwrite any data previously stored in the state variable storage array 96. In other embodiments, the contents of the state variable storage array 96 may first be deleted before saving the state variables (from state variable array 94) to the state variable storage array 96.

During a "restore" operation, e.g., restoring the state of the state machine 105 (the search state of the pattern-recognition processor 14) for a particular data flow, the state variable storage control logic 98 may send control and address signals 114 to the state variable array 94 and the state variable storage array 96. Such signals may include a "restore address" that indicates the location of the saved state variables, e.g., the location in on-chip memory 102 that includes the state variable storage array 96 and/or the location in the state variable storage array 98. During the restore operation, the stored state variables may be loaded from the state variable storage array 96 to the state variable array 94 (as shown by arrow 118). The recognition module 22 may then read the restored state variables from the state variable array 94 to reinitialize the stored data flow. In some embodiments, the present state may be saved before any restore operation to ensure that the present state is saved before being replaced by the incoming restored state.

As mentioned above, the state variables for a given state may include an identifier for a data flow. In some embodiments, the "save address" and "restore address," or some derivative or combination thereof, may be used as the identifiers for a data flow, enabling easier tracking of the switch between data flows and the outputs from the state machine 105 (and recognition module 22) for a corresponding data flow.

Figure 15:
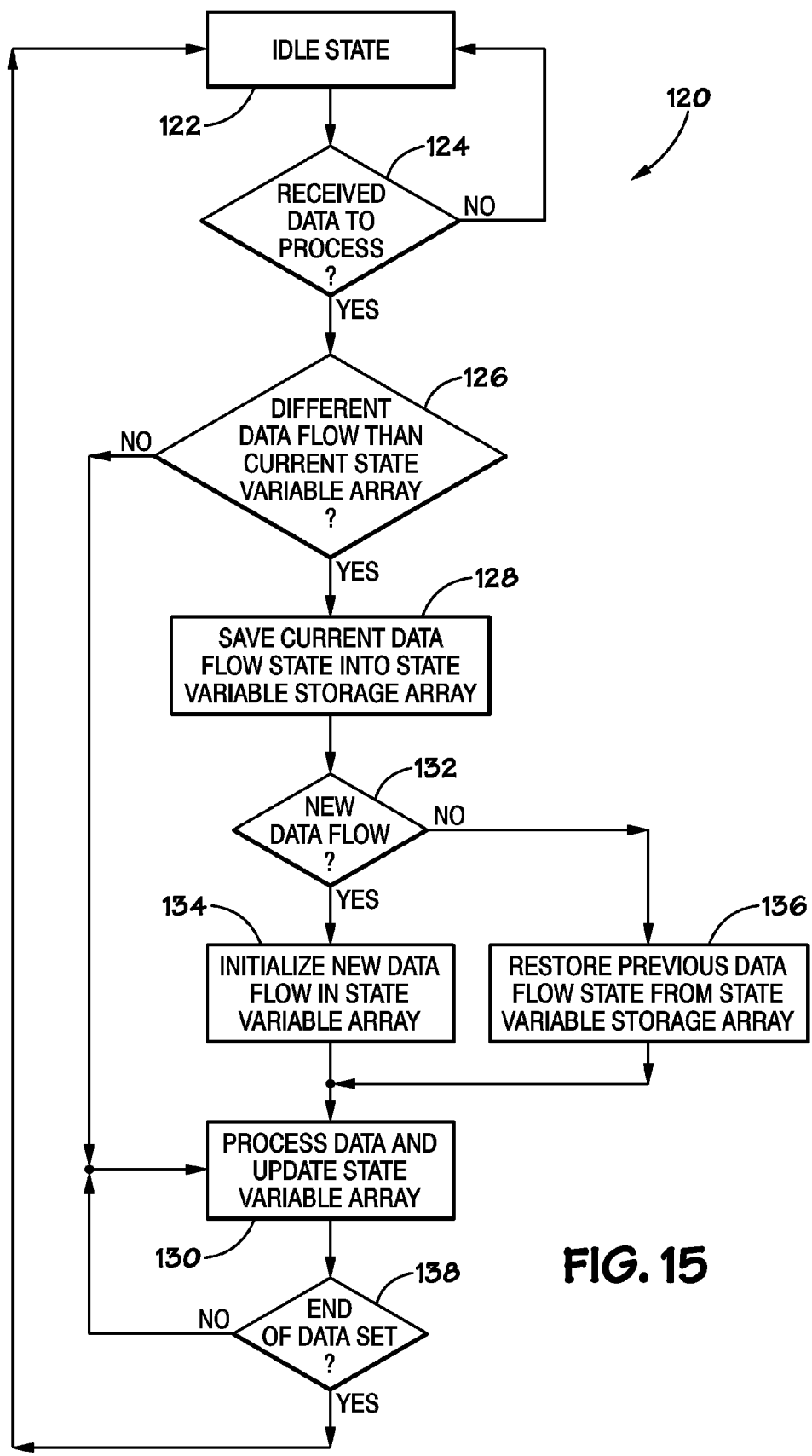
FIG. 15 depicts a process for saving and restoring a state of the pattern-recognition processor of FIG. 2.

FIG. 15 depicts a process 120 for saving and restoring states of the state machine 105 of the recognition module 22 of the pattern-recognition processor 14 in accordance with an embodiment of the present invention. Any or all portions of the process may be implemented in hardware, software (e.g., such as code stored on a tangible computer-readable medium), or combination thereof. As discussed above, the pattern-recognition processor 14 may receive one or more data flows from one or more data sources. Each data flow may include units of data, such as packets, to be processed by the pattern-recognition processor 14. Thus, saving and restoring states may be dependent on the incoming packet to be processed and determining if that packet is part of the current data flow, a previously saved data flow, or a new data flow.

When not processing any data, the state machine 105 (e.g., groups of feature cells 30 of the recognition module 22) may be in an idle state (block 122). The pattern-recognition processor 14 may wait to receive data to process (decision block 124), maintaining the idle state (block 122) if there is no received data.

After receiving data, e.g., incoming packets from a data flow, the pattern-recognition processor 14 may determine if the packets are from a data flow different from the data flow state variables stored in the state variable array 94 (decision block 126). If the packets are from a different data flow than the state variables stored in the state variable array 94, the current data flow state is saved to the state variable storage array 96 (block 128), such as by copying data from the state variable array 94 to the state variable storage array 96. As mentioned above, because the state variable storage array 96 is saved to on-chip memory 102, the saving of a state may be performed in a single cycle of the pattern-recognition processor 14. As used herein, a single cycle of the pattern-recognition processor refers to a search cycle described above that may include several system clock cycles. Such a search cycle may also be referred to as a "byte processing cycle." For example, a "byte processing cycle" refers to the processing a byte through the feature cells 30 of one or more state machines of the recognition module 22.

After saving the current state, the pattern-recognition processor 14 checks the incoming packets to determine if they are from a new data flow or a previously processed (and saved) data flow (decision block 132). If the incoming packets are from a new data flow, the search state of the new data flow is initialized in the state variable array 94 (block 134), such as by creating and/or assigning values to state variables. If the incoming packets are from a previously saved data flow, the search state of the previous data flow may be restored from the state variable storage array 96 (block 136), such as by copying data from the state variable storage array 96 to the state variable array 94.

After initializing a new data flow (block 134) or restoring a previous data flow (block 136) based on the incoming packets, the data, e.g., incoming packets, for that data flow is processed and the corresponding state variables in the state variable array 94 are updated based on the search state of that data flow (block 130).

Alternatively, if the incoming packets were determined to be from the current data flow (decision block 126), the data for the current data flow is processed and the corresponding state variables in the state variable array 94 are updated based on the search state of that data flow (block 130).

The pattern-recognition processor 14 keeps processing data and updating the search state until the end of incoming data is reached (block 138), for that data flow. Once the end of the available data, for that flow, is reached, the pattern-recognition processor 14 may return to the idle state (block 122) until more data is received.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method, comprising:
processing a portion of a first data flow via a plurality of feature cells of a pattern-recognition processor, wherein each feature cell of the plurality of feature cells comprises a group of memory cells coupled to a detection cell configured to output a search result based upon the processing;
suspending the processing of a portion of at least one packet of the first data flow prior to completion of the processing of the at least one packet of the first data flow;
saving a search state of the plurality of feature cells of the pattern-recognition processor to a first location of an on-chip memory of the pattern-recognition processor by writing all search state variables present in the search state from a second location of the on-chip memory to the first location of the on-chip memory, wherein the search state variables comprise configuration information of the group of memory cells of each feature cell of the plurality of feature cells; and
restoring the search state to the plurality of feature cells of the pattern-recognition processor from the on-chip memory of the pattern-recognition processor, wherein restoring the search state comprises transmitting the search state of the pattern-recognition processor from the first location to the second location of the on-chip memory, wherein the first location and second location are distinct locations.

2. The method of claim 1, comprising processing a second data flow after suspending processing of the first data flow.

3. The method of claim 2, comprising determining if the second data flow is a new data flow.

4. The method of claim 2, comprising determining if the second data flow corresponds to a previously saved search state of the pattern-recognition processor.

5. The method of claim 1, wherein saving the search state comprises saving the search state of the pattern-recognition processor at a first address of the first location of the on-chip memory.

6. The method of claim 5, comprising providing an identifier for the first data flow that comprises or is based on the first address.

7. The method of claim 2, comprising providing an identifier for the second data flow that comprises or is based on a second address of the first location of the on-chip memory.

8. The method of claim 1, wherein processing the first data flow comprises searching the data flow according to search criteria to produce search results.

9. The method of claim 1, comprising saving the search state of the pattern-recognition processor to an on-chip memory of the pattern-recognition processor based on receiving a packet from a different data flow than the first data flow.

10. A method comprising:
suspending processing of a portion of at least one packet of a first data flow prior to completion of the processing of the at least one packet of the first data flow, wherein the portion of the at least one packet of the first data flow is processed on a pattern-recognition processor via a plurality of feature cells of the pattern-recognition processor, wherein each feature cell of the plurality of feature cells comprises a group of memory cells coupled to a detection cell configured to output a search result based upon the processing;
saving all first state variables of the plurality of feature cells in a first search state of the pattern-recognition processor corresponding to the first data flow to a first array of on-chip memory of the pattern-recognition processor, wherein the first state variables comprise first configuration information of the group of memory cells of each feature cell of the plurality of feature cells; and
restoring all second state variables of the plurality of feature cells in a second search state of the pattern-recognition processor corresponding to a second data flow from the first array of the on-chip memory via transmission of all the second state variables to a second array of the on-chip memory of the pattern-recognition processor, wherein the second state variables comprise second configuration information of the group of memory cells of the feature cell of the plurality of feature cells, wherein the first array and second array are distinct arrays.

11. The method of claim 10, comprising switching from the first data flow to the second data flow on the pattern-recognition processor.

12. The method of claim 10, comprising receiving a request to switch from the first data flow to the second data flow.

13. The method of claim 10, wherein saving all the first state variables is performed in a search cycle of the pattern-recognition processor.

14. The method of claim 10, wherein restoring all the second state variables is performed in a search cycle of the pattern-recognition processor.

15. The method of claim 10, comprising receiving data from one or more registers to initiate saving all the first state variables or restoring all the second state variables.

16. The method of claim 10, comprising suspending processing of the portion of the at least one packet of the first data flow before saving all the first state variables.

17. The method of claim 10, comprising determining if a packet received by the pattern-recognition processor belongs to the first data flow or the second data flow.

18. A device, comprising:
a pattern-recognition processor comprising a plurality of feature cells, wherein each feature cell of the plurality of feature cells comprises a group of memory cells coupled to a detection cell configured to output a search result; and
logic configured to read and write state variables of the plurality of feature cells in a search state of the pattern recognition processor to a state variable array and save the search state of the pattern-recognition processor to an on-chip memory of the processor by writing all the search state variables present in the search state in a location separate from the state variable array in response to switching from processing a portion of at least one packet of a first data flow prior to completion of the processing of the at least one packet of the first data flow to processing a second data flow, wherein the state variables comprise configuration information of the group of memory cells of each feature cell of the plurality of feature cells, wherein the on-chip memory comprises a multi-chip module.

19. The device of claim 18, wherein the on-chip memory comprises a state variable storage array configured to save all the state variables of the search state and enable restoration of all the state variables.

20. The device of claim 18, wherein the pattern-recognition processor comprises one or more state machines and wherein the logic is configured to simultaneously save a search state of each of the one or more state machines such that the search state of the pattern-recognition processor is saved.

21. The device of claim 18, comprising one or more feature cells, configured to match a term from the first data flow or the second data flow to a search term, wherein the one or more feature cells comprise one or more state machines.

22. The device of claim 18, comprising a plurality of registers configured to provide control data to the pattern-recognition processor and/or the logic.

23. The device of claim 18, wherein the on-chip memory comprises an on-silicon memory fabricated on the same silicon as the pattern-recognition processor.

24. A device comprising:
a pattern-recognition processor comprising a plurality of feature cells, wherein each feature cell of the plurality of feature cells comprises a group of memory cells coupled to a detection cell configured to output a search result, the pattern recognition-processor comprising:
one or more state machines formed by groups of feature cells of the plurality of feature cells;
a state variable array coupled to the state machines;
a state variable storage array coupled to the state machines; and
logic configured to save all state variables of the plurality of feature cells present in a first search state of the pattern-recognition processor from the state variable array to the state variable storage array when the one or more state machines switch processing of a portion of at least one packet of a first data flow prior to completion of the processing of the at least one packet of the first data flow to processing of a second data flow, wherein the state variables comprise configuration information of the group of memory cells of each feature cell of the plurality of feature cells, wherein the state variable array is stored on a first on-chip memory and the state variable storage array is stored on a second on-chip memory, wherein the first on-chip memory and the second on-chip memory are distinct.

25. The device of claim 24, wherein the state variable storage array is directly accessible by the pattern-recognition processor.

26. The device of claim 24, wherein an identifier is associated with the state variables for the first data flow.

27. The device of claim 26, wherein the identifier comprises an address indicating where the state variables are saved.

28. The device of claim 24, wherein the logic is stored on the first on-chip memory, the second on-chip memory, or a third on-chip memory.

29. The device of claim 24, wherein the pattern-recognition processor comprises a plurality of registers configured to store control data for the logic.

* * * * *